United States Patent
Washio et al.

(10) Patent No.: US 7,409,446 B2
(45) Date of Patent: Aug. 5, 2008

(54) INFORMATION-PROVISION METHOD AND INFORMATION-PROVISION DEVICE FOR STRUCTURALIZED DOCUMENTS STORED IN DIFFERENT DEVICES CONNECTED TO A NETWORK

(75) Inventors: Suguru Washio, Kawasaki (JP); Toshimitsu Suzuki, Kawasaki (JP); Masatomo Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 981 days.

(21) Appl. No.: 09/984,621

(22) Filed: Oct. 30, 2001

(65) Prior Publication Data

US 2003/0005121 A1 Jan. 2, 2003

(30) Foreign Application Priority Data

Jun. 29, 2001 (JP) ............................. 2001-198063

(51) Int. Cl.
G06F 15/00 (2006.01)
G06F 15/16 (2006.01)

(52) U.S. Cl. ...................... 709/225; 709/217; 725/112; 725/91; 715/733; 715/513

(58) Field of Classification Search ................. 709/229, 709/202, 217, 225; 705/5; 707/104.1, 3–6, 707/2, 10, 61; 715/744, 760, 513, 517, 500
See application file for complete search history.

(56) References Cited

U.S. PATENT DOCUMENTS

| | | | | | |
|---|---|---|---|---|---|
| 5,940,842 | A | * | 8/1999 | Sakuta | 715/513 |
| 6,300,947 | B1 | * | 10/2001 | Kanevsky | 715/866 |
| 6,446,065 | B1 | * | 9/2002 | Nishioka et al. | 707/5 |
| 6,457,004 | B1 | * | 9/2002 | Nishioka et al. | 707/5 |
| 6,754,697 | B1 | * | 6/2004 | Berstis | 709/217 |
| 7,111,232 | B1 | * | 9/2006 | Bascom | 715/209 |

FOREIGN PATENT DOCUMENTS

| | | |
|---|---|---|
| JP | 10-116273 | 5/1998 |
| JP | 10-143421 | 5/1998 |
| JP | 10-143497 | 5/1998 |

* cited by examiner

*Primary Examiner*—Nathan J. Flynn
*Assistant Examiner*—Jude J Jean-Gilles
(74) *Attorney, Agent, or Firm*—Staas & Halsey LLP

(57) ABSTRACT

The object of the present invention is to provide a method and device for using network and computer resources effectively. Resources are spread out on network 3. Spread abroad herein are: structuralized documents d1, d2 on server 1*a*; structuralized documents d3, d4 on server 1*b*; and structuralized document d5 on server 1*c*. Server 1*a*, for example: 1) accepts a reference request for structuralized document d1 from client 2*a*; 2) acquires fragments f2, f3, f4, f5 for referee structuralized document d1 from server 1*a* itself and from other servers 1*b,c*; 3) embeds fragments f2-f5 in structuralized document d1; and 4) transmits embedding-processed structuralized document d1 to requester client 2*a*. A "fragment" here is all or a portion of a structuralized document.

15 Claims, 13 Drawing Sheets

[Structuralized Document d1]
```
<?xml version = "1.0" encoding="iso-8859-1"?>
<?xml-stylesheet href="doc.xsl" type="text/xsl"?>
<doc>
 <head>
  <title>XLinkRelated Site</title>
 </head>
 <body>                                                                  ⌐xl 2
  <list>
   <item>
     <xlink xml:link="extended" inline="true">
       <locator   xml:link="locator"   href="doc2.xml#child(1,head).child(1,title)"
        show="embed" actuate="auto" fjreflevel="3"/>
   <xlink>
   </item>                                                               ⌐xl 3
   <item>
     <xlink xml:link="extended" inline="true">
       <locator                                         xml:link="locator"
        href="http://izumi.flab.fujitsu.co.jp/~washio/sample/doc3.xml#child(1,head).
        child(1,title)" show="embed" actuate="auto" fjreflevel="3"/>
     </xlink>
   </item>                                                               ⌐xl 4
   <item>
     <xlink xml:link="extended" inline="true">
       <locator                                         xml:link="locator"
        href="http://izumi.flab.fujitsu.co.jp/~washio/sample/doc4.xml#child(1,head).
        child(1,title)" show="embed" actuate="aouto" fjreflevel="3"/>
     </xlink>
   </item>
  </list>
 </body>
</doc>
```

*Fig. 4*

[Structuralized Document d2]
<?xml version = "1.0" encoding="iso-8859-1"?>
<?xml-stylesheet href="doc.xsl" type="text/xsl"?>

<doc>
  <head>
    <title>Link  Server Page</title>   ~f2
  </head>
  <body>
    <p>content・・・</p>
  </body>
</doc>

*Fig. 5A*

[Structuralized Document d3]
<?xml version = "1.0" encoding="iso-8859-1"?>
<?xml-stylesheet href="doc.xsl" type="text/xsl"?>

<doc>
  <head>
    <title>XLinkTutorial:  Basics</title>   ~f3
  </head>
  <body>
    <p>content・・・</p>
  </body>
</doc>

*Fig. 5B*

[Structuralized Document d4]
<?xml version = "1.0" encoding="iso-8859-1"?>
<?xml-stylesheet href="doc.xsl" type="text/xsl"?>

<doc>                                                                f4
  <head>
    <title>XLinkTutorial:  Practical Applications          f5
      <item>
        <xlink xml:link="extended" inline="true">
          <locator                              xml:link="locator"
            href="http://izumi2.flab.fujitsu.co.jp/~washio/sample/doc5.xml#child(1,head).
            child(1,title)" show="embed" actuate="aouto" fjreflevel="3" />
        </xlink>
      </item>
    </title>
  </head>
  <body>
    <p>content・・・</p>
  </body>
</doc>

*Fig. 5C*

[Structuralized Document d5]
```
<?xml version = "1.0" encoding="iso-8859-1"?>
<?xml-stylesheet href="doc.xsl" type="text/xsl"?>
<doc>
  <head>
    <title>Practical Applications Ed. 1</title>      ~f5
  </head>
  <body>
    <p>content・・・</p>
  </body>
</doc>
```

*Fig. 6*

[Structuralized Document d1]
```
<?xml version = "1.0" encoding="iso-8859-1"?>
<?xml-stylesheet href="doc.xsl" type="text/xsl"?>
<doc>
  <head>
   <title>XLinkRelated Site</title>
  </head>
  <body>
    <list>
      <item>
        <title href="http://aoba.flab.fujitsu.co.jp/~wasio/sample/doc2.xml">
          Link Server Page
        </title>                                                              ~f2
      </item>

<item>
        <title href="http://izumi.flab.fujitsu.co.jp/~washio/sample/doc3.xml">
          XLinkTutorial: Basics
        </title>
        <copyright>
          Fujitsu Lab. Ltd.                                                   ~f3
        </copyright>
      </item>
                                                                              f4
      <item>
        <title href="http://izumi.flab.fujitsu.co.jp/~washio/sample/doc4.xml">
          XLinkTutorial: Practical Applications                               f5
            <item>
              <title href="http://izumi2.flab.fujitsu.co.jp/~washio/sample/doc5.xml">
                Practical Applications Ed. 1
              </title>
            </item>
        </title>
        <copyright>
          Fujitsu Lab. Ltd.
        </copyright>
      </item>
    </list>
  </body>
</doc>
```

Fig. 7

GET http://izumi.flab.fujitsu.co.jp/~wasio/sample/doc3.xml? —— URL for Structuralized Document d3
fjxpointer=child(1,head).child(1,title) —— Fragment Identifier
&fjfragmentid=FJ_LSP_DF_aoba.flab.fujitsu.co.jp_975486504_391077169 —— Request Identifier

HTTP/1.1

*Fig. 9A*

```
<?xml version="1.0" encoding="iso-8859-1"?>
<FJ_LSP_DF_aoba.flab.fujitsu.co.jp_975486504_391077169> —— Request Identifier
  <title FJ_LSP_CR_aoba.flab.fujitsu.co.jp_975486504_391077169 ⎫
="Fujitsu Lab Ltd."> ⎬—— Copyright Information
    XLink Tutorial: Basics ⎭
  </title> ⎫
</FJ_LSP_DF_aoba.flab.fujitsu.co.jp_975486504_391077169> ⎬—— Fragment f3
```

*Fig. 9B*

XLink Related Site

• Link Server Page
  _____

• XLink Tutorial: Basics
  _____

Copyright Fujitsu Lab. Ltd.

• XLink Tutorial: Practical Applications
  _____

Copyright Fujitsu Lab. Ltd.

• Practical Applications Ed. 1

*Fig. 12*

INFORMATION-PROVISION METHOD AND INFORMATION-PROVISION DEVICE FOR STRUCTURALIZED DOCUMENTS STORED IN DIFFERENT DEVICES CONNECTED TO A NETWORK

BACKGROUND OF THE INVENTION

1. Technical Field

The present invention relates to technology for providing network-based resources, especially structuralized text, to user terminals.

"Resources" as set forth in the present invention are data that, regardless of the data form, can be provided on a network. Resources may be, to give an example, any such as structuralized documents, text files, image files, or program files. Further, resources may be data files in their entirety, or partially. A portion of a structuralized document could also be a resource.

A "structuralized document" means a data file described in a structuralized language (markup language) such as XML (Extensible Markup Language), or SGML (Stand Generalized Markup Language). A "fragment" means a portion of a structuralized document.

2. Description of Related Art

In displaying network-based resources on user terminals, methods that greatly load down the networks and user terminals are used. FIG. 14 shows a user terminal 1 connected through a network to resource-storing servers S1, S2. A link to fragment f2 is included in structuralized document d1 stored on the server S1. Fragment f2 is a portion of structuralized document d2 stored on the separate server S2.

The user terminal 1 requests structuralized document d1 from server S1, and acquires it from the server S1. Subsequently, the user terminal 1 structurally parses structuralized document d1. When the user terminal 1 carries out a section reference—that is within structuralized document d1—to the other structuralized document d2, it acquires structuralized document d2 from the server S2.

The user terminal 1 next parses structuralized document d2, and extracts fragment f2, indicated by a partial-reference identifier xl2 within structuralized document d1, from structuralized document d2. The user terminal 1 thereafter embeds extracted fragment f2 into structuralized document d1.

When carrying out the process just noted, even if the section reference xl2 refers only to a portion f2 of structuralized document d2, the user terminal 1 must acquire the entire structuralized document d2. This is true despite the fact that the section referent is often quite small compared to the entire structuralized document. Accordingly, with the goal of acquiring an extremely small part of a structuralized document, acquiring the structuralized document in its entirety over a network is a largely wasteful process.

The reason why is that the time required for data transmission ends up occupying a relatively large block in the structuralized document processing time. This is caused by the data transmission speed on the network being in general slow compared to the data transmission speed on the bus within the computer. Networks among server-user terminals especially are low speed compared to networks among servers. Accordingly, in situations where the process just described is carried out on a user terminal, much time is consumed by data transmission, whereupon most of the acquired structuralized document is discarded as unnecessary information.

Moreover, in situations where section references within structuralized documents are increased, or situations where within the structuralized document at a referent, further section references are included, the processing burden on the user terminals ends up being great. The reason why is that fragments have to be extracted by parsing the relevant structuralized document in its entirety.

On the other hand, whether a user terminal seeks to refer to an entire structuralized document, or seeks to refer to a portion of a structuralized document cannot be judged on the server end. This therefore risks copyright problems arising with respect to the section references. The reason being most text providers assume that the texts are referred to as is in their original form. More precisely, text providers are displeased by portions of their structuralized documents being extracted without permission and embedded into other structuralized documents, and yet not being able to grasp the places referring to those portions.

Furthermore, controlling the section-reference referents according to the text providers' intentions by the method described above is problematic. The reason why is that structuralized documents are acquired, and the fragment-extracting process is carried out, on the user end. Services that control fragments provided in reply to referrer users are for example contemplated. In this case, leaving control of the section-reference referents to the user-terminal end is not secure. This is because the user terminals are able to gain all of the information in the foregoing structuralized documents. Likewise, it is difficult for administrators of reference-destination structuralized documents to make practicable a process by which, e.g., only section references from certain specified structuralized documents are permitted. Therefore, administrators themselves have to monitor how structuralized documents are referred to.

SUMMARY OF THE INVENTION

An object of the present invention is to provide technology that reduces the load on a network in using resources on the network.

The present invention provides an information provision method for receiving a request from a terminal device connected to a network and providing structural information distributed spread out to information-provision devices connected to the network. The information provision method includes:

a step of accepting a lookup request for a first structuralized document from the terminal device;

a step of extracting a section-reference description that is in terms of an item of second structural information or of a second structural information group, contained within the first structural information;

a step of requesting from an information-provision device or information-provision devices in which the item of second structural information or the structural information group is stored, a relevant section which is designated by the section reference description for the second structural information or the structural information group; and a step, if the requested relevant section of the second structural information or the structural information group is obtained, of embedding the relevant section of the second structural information or the structural information group into the first structural information, and sending the embedding-modified first structural information to the terminal device.

This method may be applied to a server that stores, for example, structuralized documents as resources. The server extracts from requested structuralized document d1 a reference to fragment f2 of structuralized document d2, obtains fragment f2 from another server, embeds fragment f2 into structuralized document d1, and sends the fragment-embedded structuralized document d1 back to the requester. If fragment f2 is a portion of structuralized document d2, only the required section is delivered over the network, which therefore relieves the network burden. Further, such processes as obtaining text d2 apart from the target structuralized document d1, or parsing, are reduced.

A second aspect of the present invention provides an information provision method utilized by a first information-provision device included among information-provision devices connected to an information display device via a network. The information provision method includes:

an acceptance step of accepting from the information display device a provision request for a first resource containing a description of a reference to a second resource on the network;

a reference extraction step of reading out the first resource, and extracting from the first resource the description of the reference to the second resource;

an address-judging step of judging, based on the description of the reference to the second resource, whether the second resource is held in the first information-provision device, or is held in a second information-provision device included among the information-provision devices;

a resource read-out step, if the second resource is held in the first information-provision device, of reading out the second resource;

a resource acquisition step, if the second resource is not held in the first information-provision device, of requesting the second resource and acquiring it from the second information-provision device holding the second resource;

an embedding step of embedding the second resource into the first resource; and a transmitting step of transmitting the first resource, into which the second resource is embedded, to the information display device via the network.

This method may be applied to a first server in which, for example, structuralized documents d1, d2 are stored. Structuralized document d1 refers to fragment f2 included in structuralized document d2. If structuralized document d1 has been requested, the first server reads out fragment f2, or obtains fragment f2 from a second server, embeds it into structuralized document d1, and sends this back to the requester.

A third aspect of the present invention provides the information provision method set forth in the second aspect. The information provision method further includes:

a reference retrieval step of retrieving from within the second resource a description of a reference to a third resource on the network; and a control step, if there is a reference to a third resource, of carrying out on the third resource the address-judging step, the resource read-out step, the resource acquisition step, and the embedding step.

For example, if a reference to fragment f3 within structuralized document d3 is described in fragment f2, the first server extracts it. Thereafter the first server judges whether or not a third resource is on the first server, and if on the first server, reads it out and embeds it in fragment f2.

A fourth aspect of the present invention provides the information provision method set forth in the second aspect, wherein the resource acquisition step requesting a resource includes:

a sub-step of transmitting a request identifier specifying the second-resource request, in addition to the request for the second resource; and a sub-step of acquiring the request identifier, in addition to the second resource.

The first server assigns according to the request identifier correspondences between a request from the first server to the second server for fragment f2, and fragment f2 sent in to the first server from the second server.

A fifth aspect of the present invention provides the information provision method set forth in the second aspect, wherein:

the resource acquisition step includes a sub-step of transmitting a suspend condition for suspending acquisition of the second resource, in addition to the request for the second resource.

For example, the first server transmits as a suspend condition a time limit for replying. A second server that has accepted this transmits a second resource within the time limit. A referrals-remaining count may also be transmitted as the suspend condition.

A sixth aspect of the present invention provides the information provision method set forth in the second aspect, wherein:

the acceptance step includes a sub-step of accepting a referral level for the information display device, in addition to the provision request from the information display device; and further including:

a comparison step of comparing a disclosure level contained in a referee or referrer resource, with the referral level; and a referral restriction step of restricting embedding of the referee resource into the referrer resource based on the comparison results.

For example, a "3" disclosure level is established for referee fragment f2 in structuralized document d1. The referral level for the information display device then might be "4." In this case, because the referral level is higher than the disclosure level, embedding of fragment f2 is executed.

A seventh aspect of the present invention provides the information provision method set forth in the second aspect, wherein:

the resource acquisition step includes a sub-step of sending a requester identifier identifying a resource-acquisition requester, in addition to the acquisition request to the second information-provision device.

The first server transmits to the second server the request for acquisition of the second resource, and information identifying the requesting individual. The second server, by assigning a correspondence between and storing the resource and the information identifying the requesting individual, comprehends information as to who has referred to what resource how many times.

An eighth aspect of the present invention provides an information provision method utilized by a second information-provision device, connected via a network to a first information-provision device holding resources that include a first resource, and holding resources that include a second resource to which the first resource refers. The information provision method includes:

a request-acceptance step of accepting from the first information-provision device a request for acquisition of the second resource;

an extraction step of extracting the second resource from the resources that include the second resource; and a transmitting step of transmitting via the network the second resource to the first information-provision device.

Supposing for the moment that structuralized document d1 (first resource) refers to fragment f2 (second resource) within structuralized document d2, in terms of the first invention this method would then apply to the second server (second information-provision device), to which a request for fragment f2 is made from the first server (first information-provision device). In reply the second server sends fragment f2, which it itself holds, to the first server.

A ninth aspect of the present invention provides the information provision method set forth in the eighth aspect. The information provision method further includes:

a retrieval step of reading out the second resource and retrieving a description of a reference to a third resource on the network;

an address-judging step of judging, if there is a description of a reference to a third resource, whether or not the third resource is held in the second information-provision device;

a resource read-out step, if the third resource is held in the second information-provision device, of reading out the third resource; and an embedding step of embedding the third resource into the second resource.

The second server, if the description of the reference to fragment f3 in the server itself is in requested fragment f2, embeds fragment f3 into fragment f2. The same process is likewise carried out if in fragment f3 there is further a reference description to another resource.

A tenth aspect of the present invention provides the information provision method set forth in the ninth aspect. The information provision method further includes:

a resource-request step, if the third resource is not held in the second information-provision device, of requesting the third resource from a network-connected third information-provision device holding the third resource; and a resource acquisition step of acquiring the third resource from the third information-provision device.

The second server, if the requested referee f3 in fragment f2 is on the other, third server, the referee f3 content is acquired from the third server.

An eleventh aspect of the present invention provides the information provision method set forth in the tenth aspect, wherein:

the request-acceptance step includes a sub-step of transmitting a request identifier specifying the second-resource request, in addition to the request for the second resource;

the resource-request step includes a sub-step of transmitting the request identifier, in addition to the request for the third resource; and the resource acquisition step includes a sub-step of acquiring the request identifier, in addition to the third resource.

The second server makes a request for fragment f3, which it correlates with the request for the second resource.

A twelfth aspect of the present invention provides the information provision method set forth in the tenth aspect, wherein:

the request-acceptance step includes a sub-step of accepting a suspend condition for suspending acquisition of the third resource, in addition to the acquisition request for the second resource; and further including:

a suspending step of suspending acquisition of the third resource based on the suspend condition.

The second server through the first server is notified of, e.g., a time limit. The second server, if unable within the time limit to acquire the fragment f3 to which fragment f2 refers, suspends acquisition of fragment f3.

A thirteenth aspect of the present invention provides the information provision method set forth in the tenth aspect, wherein:

the request-acceptance step includes a sub-step of accepting a referral level for the information display device having requested provision of the first resource to the first information-provision device, in addition to the acquisition request for the second resource; and the resource-request step includes a sub-step of transmitting the referral level for an information display device having requested provision of the first resource, in addition to the request for the third resource.

The second server, if fragment f2 requested by the first server contains a reference to fragment f3 on the third server, adds the information display device reference level to the fragment f3 request.

A fourteenth aspect of the present invention provides the information provision method set forth in the tenth aspect, wherein:

the request-acceptance step includes a sub-step of transmitting a request identifier specifying the second-resource request, in addition to the acquisition request for the second resource; and the transmitting step includes a sub-step of transmitting the request identifier, in addition to the second resource.

The second server adds to the resource the request identifier that the first server transmits together with the request, and transmits the combined information.

A fifteenth aspect of the present invention provides the information provision method set forth in the eighth aspect, wherein:

the request-acceptance step includes a sub-step of accepting a referral level for the information display device having requested provision of the first resource to the first information-provision device, in addition to the acquisition request for the second resource; and further including:

a comparison step of comparing a disclosure level contained in a referee or referrer resource, with the referral level; and a referral restriction step of restricting embedding of[1] the referee resource into the referrer resource based on the comparison results.

Supposing for example that the disclosure level for fragment f2 that the second server holds is "5," then the second server will refuse a lookup request for fragment f2 from a referral level "4" information display device.

A sixteenth aspect of the present invention provides the information provision method set forth in the eighth aspect, wherein:

the acquisition step includes a sub-step of accepting a requester identifier identifying a requester having requested provision of the second resource, in addition to the resource-acquisition request from the first information-provision device; and further including:

a log step of respectively assigning correspondences between, and storing, the second resource and the requester identifier, as well as a resource that the second information-provision device holds and that is the referee of the second resource, and the requester identifier.

A resource access log is created in the second server, which receives a request for fragment f2 from the first server.

A seventeenth aspect of the present invention provides the information provision method set forth in the eighth aspect, wherein the second resource is a portion of a structuralized document, further including an extraction step of extracting the second resource from the structuralized document, by parsing the structuralized document.

An eighteenth aspect of the present invention provides a first information-provision device, included among information-provision devices connected to an information display device via a network. The first information-provision device is furnished with:

an acceptance means for accepting from the information display device a provision request for a first resource containing a description of a reference to a second resource on the network;

a reference extraction means for reading out the first resource, and extracting from the first resource the description of the reference to the second resource;

an address-judging means for judging, based on the description of the reference to the second resource, whether the second resource is held in the first information-provision device, or is held in a second information-provision device included among the information-provision devices;

a resource read-out means for, if the second resource is held in the first information-provision device, reading out the second resource;

a resource acquisition means for, if the second resource is not held in the first information-provision device, requesting the second resource and acquiring it from the second information-provision device holding the second resource;

an embedding means for embedding the second resource into the first resource; and a transmitting means for transmitting the first resource, into which the second resource is embedded, to the information display device via the network.

This device has the same functional effects as the second invention.

A nineteenth aspect of the present invention provides a computer-readable storage medium on which is recorded an information provision program utilized by a first information-provision device included among information-provision devices connected to an information display device via a network. The computer-readable storage medium on which is recorded an information provision program executes:

an acceptance step of accepting from the information display device a provision request for a first resource containing a description of a reference to a second resource on the network;

a reference extraction step of reading out the first resource, and extracting from the first resource the description of the reference to the second resource;

an address-judging step of judging, based on the description of the reference to the second resource, whether the second resource is held in the first information-provision device, or is held in a second information-provision device included among the information-provision devices;

a resource read-out step, if the second resource is held in the first information-provision device, of reading out the second resource;

a resource acquisition step, if the second resource is not held in the first information-provision device, of requesting the second resource and acquiring it from the second information-provision device holding the second resource;

an embedding step of embedding the second resource into the first resource; and a transmitting step of transmitting the first resource, into which the second resource is embedded, to the information display device via the network.

This program has the same functional effects as the second invention.

A twentieth aspect of the present invention provides an information provision computer product for operating a computer as a first information-provision device included in a group of information-provision devices connected to an information display device via a network. The information provision computer product operates a computer as:

an acceptance means for accepting from the information display device a provision request for a first resource containing a description of a reference to a second resource on the network;

a reference extraction means for reading out the first resource, and extracting from the first resource the description of the reference to the second resource;

an address-judging means for judging, based on the description of the reference to the second resource, whether the second resource is held in the first information-provision device, or is held in a second information-provision device included in the group of information-provision devices;

a resource read-out means for, if the second resource is held in the first information-provision device, reading out the second resource;

a resource acquisition means for, if the second resource is not held in the first information-provision device, requesting the second resource and acquiring it from the second information-provision device holding the second resource;

an embedding means for embedding the second resource into the first resource; and a transmitting means for transmitting the first resource, into which the second resource is embedded, to the information display device via the network.

This computer product has the same functional effects as the second invention.

A twenty-first aspect of the present invention provides a second information-provision device, connected via a network to a first information-provision device holding resources that include a first resource, and holding resources that include a second resource to which the first resource refers. The second information-provision device is furnished with:

a request-acceptance means for accepting from the first information-provision device a request for acquisition of the second resource;

an extraction means for extracting the second resource from the resources that include the second resource; and a transmitting means for transmitting via the network the second resource to the first information-provision device.

This device has the same functional effects as the eighth invention.

A twenty-second aspect of the present invention provides a computer-readable storage medium on which is recorded an information provision program utilized by a second information-provision device, connected via a network to a first information-provision device holding resources that include a first resource, and holding resources that include a second resource to which the first resource refers. The computer-readable storage medium on which is recorded an information provision program executes:

a request-acceptance step of accepting from the first information-provision device a request for acquisition of the second resource;

an extraction step of extracting the second resource from the resources that include the second resource; and a transmitting step of transmitting via the network the second resource to the first information-provision device.

This program has the same functional effects as the eighth invention.

A twenty-third aspect of the present invention provides an information provision method for providing structural information distributed spread out to a group of network-connected information-provision devices including first and second information-provision devices. The information provision method includes:

a step of accepting from the first information-provision device a request for a portion of first structural information; and a step of acquiring the portion of the first structural information, being registered in the second information-provision device, of confirming presence/absence of a description of a section reference to second structural information within the portion of the first structural information, and of further acquiring, if a section reference to the second structural information exists, the second structural information, embedding it into the first structural information, and transmitting this to the first information-provision device, being the requester.

A twenty-fourth aspect of the present invention provides an information provision method for providing structural information distributed spread out to a group of network-connected information-provision devices including first and second information-provision devices. The information provision method is characterized by including:

a step of accepting from the first information-provision device a request for a portion of first structural information containing identifying information on an information requester; and a step of acquiring the portion of the first structural information, being stored in the second information-provision device, and transmitting this to the first information-provision device, being the requester, and of assigning a correspondence between and storing the portion of the first item of structural information and the information requester identifying information.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 4 is a specific example of structuralized document d1;

FIG. 5A is a specific example of structuralized document d2;

FIG. 5B is a specific example of structuralized document d3;

FIG. 5C is a specific example of structuralized document d4;

FIG. 6 is a specific example of structuralized document d5;

FIG. 7 is a specific example of structuralized document d1 on which an embedding process has been performed;

FIGS. 9A and 9B are diagrams illustrating fragment extraction request and receipt scheme;

FIG. 12 is an example of display on client 2a of structuralized document d1;

DETAILED DESCRIPTION OF THE PREFERRED EMBODIMENTS

Invention Overview

Figure 1:
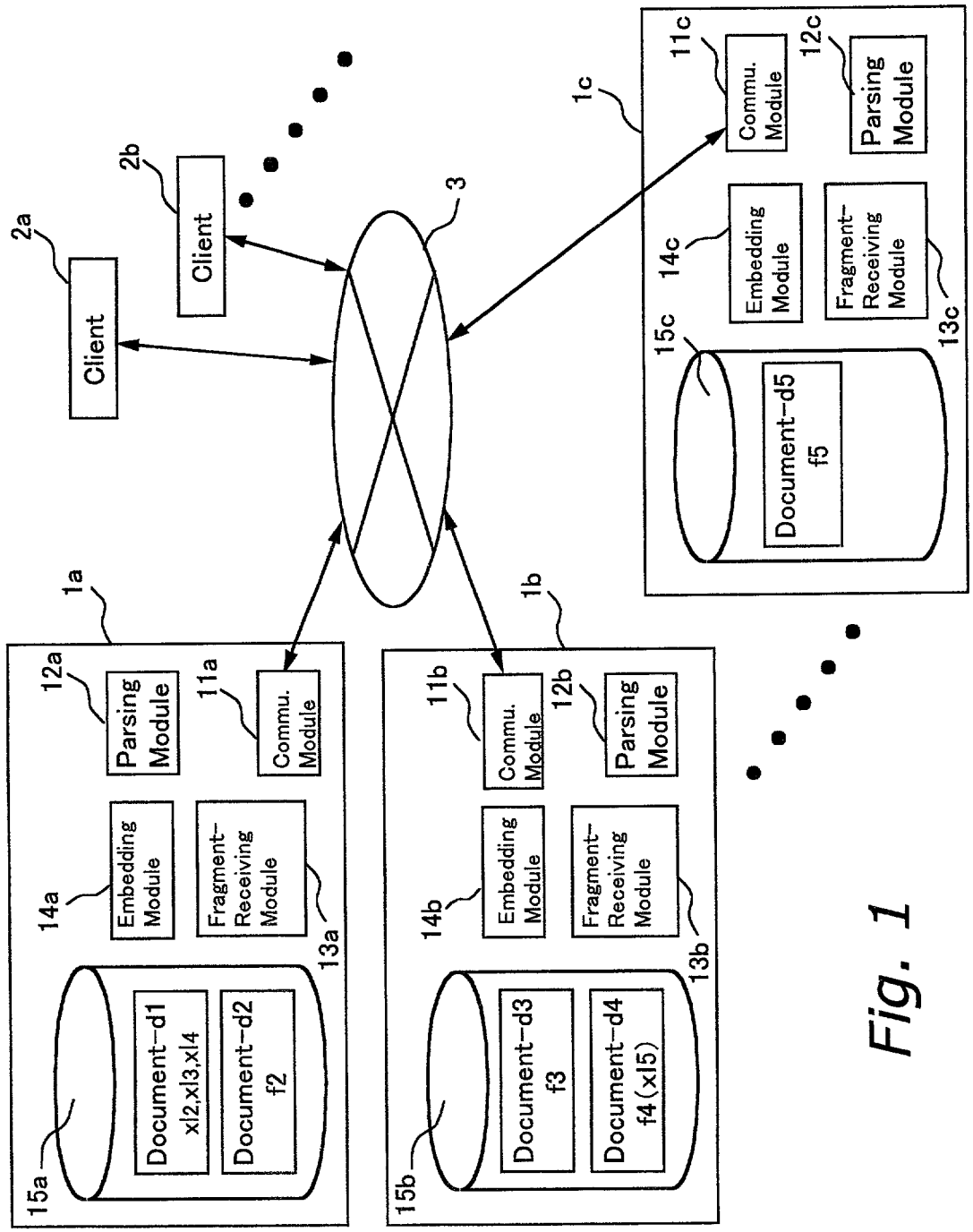
FIG. 1 is an overall configurational diagram of an information provision system having to do with a first embodied example.

FIG. 1 is an overall conceptual diagram of an information provision system to which the present invention is applied. The system includes servers 1a, b, c; clients 2a, b; and network 3. Resources are spread out on the network 3. Herein, spread out to server 1a are structuralized documents d1, d2; to server 1b, structuralized documents d3, d4; and to server 1c, structuralized document d5.

In such circumstances, server 1a, for example: 1) accepts a lookup request for structuralized document d1 from client 2a; 2) acquires reference-destination fragments f2, f3, f4, f5 for section references x12, x13, x14 contained within structuralized document d1 from server 1a itself and from the other servers 1b, c; 3) embeds fragments f2-f5 into structuralized document d1; and 4) transmits the embedding-processed structuralized document d1 to the requester client 2a.

Figure 2:
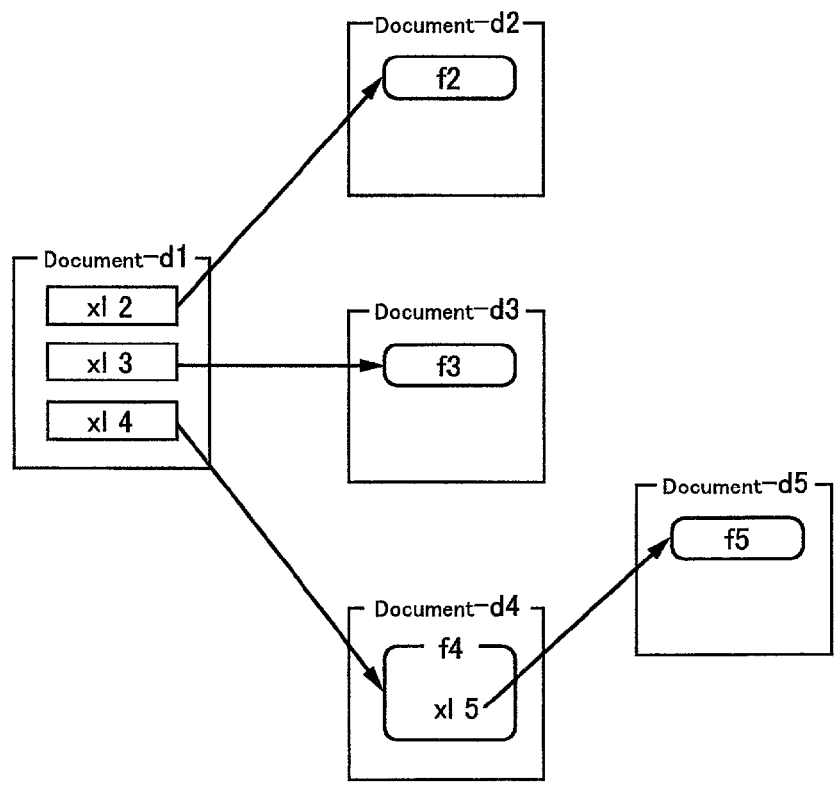
FIG. 2 is a diagram of reference relationships among structuralized documents d1-d5 in FIG. 1.

FIG. 2 diagrams reference relationships among structuralized documents d1-d5. Structuralized document d1 has references to structuralized documents d2, d3, d4; while structuralized document d4 has a reference to structuralized document d5. Specifically, structuralized document d1 contains section references x12, x13, x14. Herein, "section reference" means a link to a resource on the network. Section references x12, x13 and x14 refer respectively to fragments f2, f3 and f4. Fragments f2, f3, and f4 refer to respective portions of structuralized documents d2, d3 and d4. Furthermore, fragment f4 contains section reference x15 referring to fragment f5.

In this respect, although not illustrated, the referent or referrer fragment at times will contain a disclosure level for the fragment. The disclosure level is used to compare with a referral level for a client 2, and judge whether to provide the fragment to the client 2 (see later-described FIG. 4). Further, furnishing time limits or else acquisition count limits for transmission/reception among the servers 1 is possible (see later-described FIG. 9). This is because acquisition of referent resources could continue limitlessly, and transmitting data among the servers 1 could conceivably take up time due to network congestion.

Figure 3:
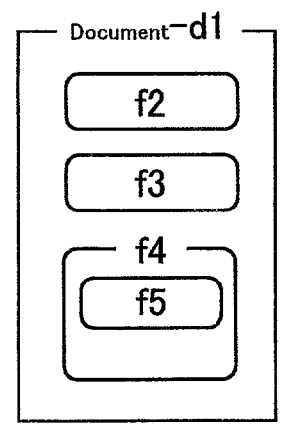
FIG. 3 is a conceptual diagram of fragments f2-f5 embedded in structuralized document d1.

FIG. 3 is a conceptual explanatory diagram of fragments f2-f5 embedded in structuralized document d1. In the example of the present embodiment, server 1a carries out embedding of fragments f2-f5, and provides structuralized document d1 into which referent content is embedded. Although not illustrated, is some cases the fragments will contain copyright information.

In this way, with the present invention, a resource that correlates to a requested structuralized document is embedded by a server into a structuralized document. Accordingly, data transmission between the servers 1 and the clients 2 is done without waste, which relieves the load on the network and the processing burden on the clients.

First Embodied Example

Next, to explain specifically an information provision method having to do with the present invention, a first embodied example will be given. To take an example that facilitates explanation, an instance where server 1a embeds fragments f2-f5 into the aforementioned structuralized document d1 and provides it to client 2a will be explained in the following.

Configuration

(1) Configuration Overall

Referring once more to FIG. 1, the overall configuration of an information provision system having to do with the first embodied example of the present invention will be explained. Servers 1a, b, c, which are information-provision devices, are connected via network 3 to clients 2a, b. For the clients 2, a Web browser operating on a computer may be used. For the network 3 the Internet, dedicated lines, public telephone lines, or mobile communications networks may used.

(2) Servers

A server 1 carries out an embedding process that embeds fragments into structuralized documents, and a fragment extraction processes that extracts fragments and provides them to another of the servers 1. Functions of the servers 1 will be explained below, taking up server 1a as an example with regard to the embedding process, and server 1b with regard to the fragment extraction process. Nevertheless, the servers 1a, b, c preferably are capable of executing both processes.

(2-1) Server 1a (Embed-Processing Function)

Server 1a is equipped with communications module 11a, parsing module 12a, fragment-receiving module 13a, embedding module 14a, and text DB 15a.

Communications module 11a may be realized by using, e.g., a WWW server. Communications module 11a accepts requests for structuralized document d1 from client 2a, and transmits embedding-processed structuralized documents d1 to client 2a. Further, communications module 11a transmits to server 1b requests to extract fragments f3, f4.

Parsing module 12a reads out and parses a requested structuralized document d1 from text DB 15a, to extract section references x12, x13, x14 contained in the document d1. Parsing module 12a carries out the next process by whether the section referent is on its server or on another server. With regard to a section referent that is on its server, structuralized document d2 is read out and parsed from text DB 15a, and fragment f2 is extracted. On the other hand, with regard to section referents that are on another server 1b, parsing module 12a transmits to the other server 1b a request to extract fragments f3, f4.

Fragment-receiving module 13a receives extracted fragments f3, f4 from server 1b. Embedding module 14a embeds fragments f2, f3, f4 into structuralized document d1. Structuralized documents d1, d2 are stored in text DB 15a.

(2-2) Server 1b (Fragment-Extraction Processing Function)

Server 1b is equipped with communications module 11b, parsing module 12b, fragment-receiving module 13b, embedding module 14b, and text DB 15b. Structuralized documents d3, d4 are stored in text DB 15b. Communications module 11b has the same functions as the foregoing communications module 11a.

Parsing module 12b reads out from text DB 15b structuralized documents d3, d4 containing fragments f3, f4 for which there was a request from server 1a. Parsing module 12b also parses structuralized documents d3, d4 and extracts fragments f3, f4. Further, parsing module 12b extracts from fragment f4 section reference x15 referring to fragment f5, and makes a request to server 1c, via communications module 11b, for extraction of fragment f5.

Fragment-receiving module 13b receives fragment f5 content from other server 1c.

Embedding module 14b embeds fragment f5 into fragment f4.

Specific Examples of Structuralized Documents

Next, referring to FIGS. 4-7, specific examples of structuralized documents d1-d5 and section references will be illustrated. Herein, an instance in which structuralized documents d1-25 are described in XML is illustrated.

FIG. 4 is a specific example of a structuralized document d1. The section references x12, x13, x14 to fragments f2, f3, f4 are described in structuralized document d1. In this example, "Xlink Working Draft 3 Mar. 1998" is used in the description for carrying out the section reference, and "Xpointer (XML Pointer Language)" is used in the fragment-designation description.

In the section reference x13 to fragment f3, for example, tag <xlink> designates carrying out a section reference. Further, "http://izumi.flab.fujitsu.co.jp/~washio/sample/doc3.xml#child(1,head).child(1,title)", which designates fragment f3, is described in tag <locator> within tag <link>. Herein, the content of tag <title> within tag <head> in structuralized document d3 on server 1b is designated by the section referent.

In addition, the disclosure level fjreflevel="3" is designated in the section reference x13. The disclosure level is compared with a referral level for client 2a. According to the comparison results, referral from client 2a to fragment f3 is restricted. Client 2a referral level is for example established by contract with a server 1, and stored in a (not-illustrated) database within the server. In this respect, if a referral level is not contained in a section reference, referrals are not restricted and anyone may make a referral to the fragment.

FIGS. 5A, 5B, 5C are specific examples of respective structuralized documents d2, d3, d3. The content of fragments f2, f3 and f4, which are referred to by section references x12, x13 and x14, are respectively described in structuralized documents d2, d3, d4. For example, the content XLink Tutorial: Basics in fragment f3 is described in tag <title> within tag <head> in structuralized document d3. Further, XLink Tutorial: Practical Applications and section reference x15 to fragment f5 are described, for the content of fragment f4, in the tag <title> in structuralized document d4.

FIG. 6 is a specific example of structuralized document d5. In structuralized document d5, the content Practical Applications Ed. 1 in fragment f5 is described in the tag <title> within the tag <head>.

FIG. 7 is a specific example of an embedding-processed structuralized document d1. Fragments f2-f5 illustrated in FIGS. 5 and 6 are embedded into the embedding-processed structuralized document d1. Specifically, the content of fragments f2-f4 is embedded instead of the section references x12-x14. Further, the content of fragment f5 is embedded within fragment f4, replacing the section reference x15 within fragment f4. Moreover, information concerning copyright for fragments f3, f4 is embedded together with the content.

Process Flows Next, with regard to flow of processes in the present system, a (1) overall routine; a (2) method by which fragments are sent/received among the servers; and a (3) server routine will be explained in turn. In the following, an example is taken in which structuralized documents d1-d5 are the XML documents shown in the foregoing FIGS. 4-6.

(1) Overall Routine

Figure 8:
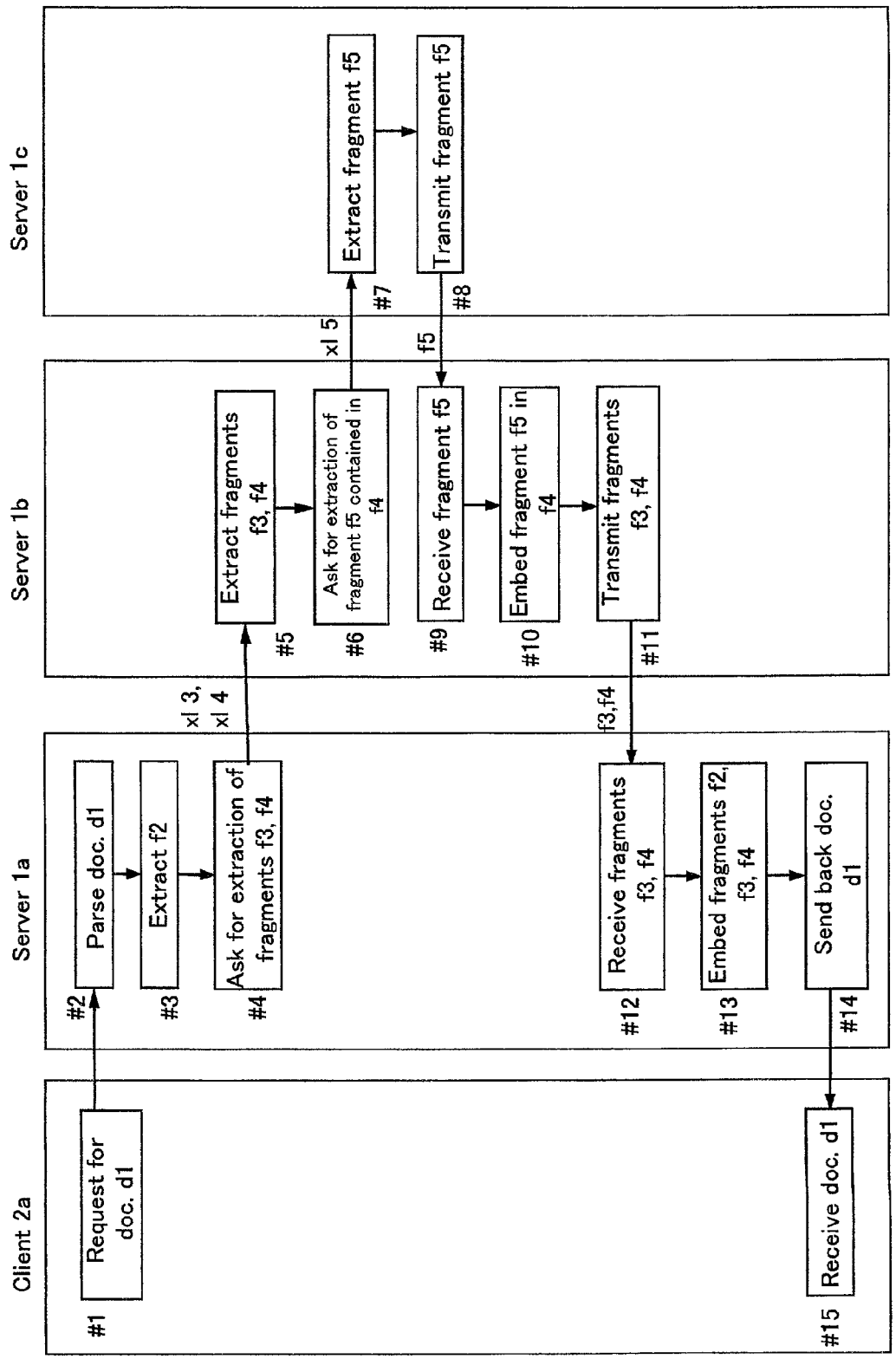
FIG. 8 is an explanatory diagram illustrating flow of all routines in the information provision system of FIG. 1.

FIG. 8 is an explanatory diagram illustrating collectively the processes that an information provision system having to do with the present invention carries out.

When client 2a requests structuralized document d1, server 1a reads out structuralized document d1 from text DB 15a, and parses structuralized document d1 (#1, #2). The parsing results in server 1a extracting section references x12, x13 and xl4. With regard to section reference xl2, for which the referee structuralized document d2 is present on the same server, server 1a reads out and parses structuralized document d2 from text DB 15a, and extracts fragment f2 (#3). Meanwhile, with regard to section references xl3, xl4, for which the referee structuralized documents d3, d4 are present on other server 1b, server 1a transmits to server 1b a request to extract fragments f3, f4 (#4).

When server 1b receives the request to extract fragments f3, f4, it reads out and parses structuralized documents d3 and d4 from text DB 15b, and extracts fragments f3 and f4 (#5). Because fragment f4 is contained in section reference xl5, server 1b transmits a request to extract fragment f5 to server 1c, where structuralized document d5 that will become the referee is present (#6).

When server 1c receives the request to extract fragment f5, it reads out and parses structuralized document d5 from the text DB 15c, and extracts fragment f5 (#7). Server 1c then transmits extracted fragment f5 to server 1b (#8).

When server 1b receives fragment f5, it embeds fragment f5 into fragment f4 (#s 9, 10). Server 1b then transmits fragment f3 and embedding-processed fragment f4 to server 1a (#11).

Server 1a receives fragments f3 and f4, and embeds extracted fragment f2 and received fragments f3 and f4 into structuralized document d1 (#s 12, 13). Subsequently server 1a transmits the embedding-processed structuralized document d1 to client 2a (#14). Client 2a receives and displays the embedding-processed structuralized document d1 (#15).

(2) Fragment Transmission Request

FIG. 9 is an explanatory diagram for explaining how fragment extraction requests and fragment receipt are handled among servers 1a, b, c. Herein, the explanation takes as an example an instance where server 1a transmits to server 1b a request to extract fragment f3, and receives fragment f3 from server 1b.

FIG. 9A illustrates an example of the format of an extraction request. In the situation in which communications among the servers 1a, b, c take place by HTTP, the extraction request from server 1a to server 1b is described by the "GET method." The extraction request contains a URL for structuralized document d3, a fragment identifier, and a request identifier. Moving on to fjxpointer=, which indicates the fragment identifier, the fragment designated by section reference xl3 is described.

Continuing with fjfragmentid=, which indicates the request identifier, information for specifying each extraction request is described. Herein, items 1)-4) noted below are contained in the request identifier.

1) FJ_LSP_DF, indicating a request to extract fragment f3;

2) aoba.fjuitsu.co.jp, the address of server 1a, to which the extraction request was made;

3) 975486504, the time when the lookup request was received from client 2a; and 4) 391077169, a random number.

When server 1b receives the extraction request, it extracts fragment f3 based on the fragment identifier. Here the time that the lookup request was received may, as will be described later, be utilized in setting the time limit for replying to the clients 2.

FIG. 9B is an example of the text of a fragment for fragment transmission. Transmission of a fragment from server 1b to server 1a is carried out using fragment text described in XML. The fragment text contains the foregoing request identifier, and the requested fragment f3. Fragment identifier FJ_LSP_DF_aoba.fjuitsu.co.jp_975486504_391077169 is used as the tag name for correlating the fragment text with the foregoing extraction request. When server 1a receives the fragment text, it assigns a correspondence between the extraction request and the received fragment f3, based on the request identifier contained in the fragment text.

Further, if there is to be copyright information in structuralized document d3, the copyright information may be annexed to the fragment text also. In this example, copyright information FJ_LSP_CR_aoba.fjuitsu.co.jp_975486504_391077169="Fujitsu Lab Ltd." is embedded in the tag <title>. Herein, FJ_LSP_CR indicates copyright information that corresponds to the foregoing request identifier. If it is also the case that the copyright information is contained in the referee structuralized document d3, then the copyright information will also be contained in text DB 15b on server 1b. When server 1b accepts an extraction request that contains a request identifier with copyright information, it extracts the relevant portion of the requested structuralized document d3, and at the same time acquires the copyright information contained in the structuralized document d3, or the copyright information within text DB 15b, and creates the fragment.

Here, servers not having a fragment-extraction-process function, e.g., ordinary Web servers, will not recognize fragment identifiers and request identifiers that contain extraction requests. Such servers analyze up to the URL containing the extraction request, and transmit the entire structuralized document d3 to server 1a. Due to the fact that a request identifier is not described in the transmitted structuralized document d3, the server 1a recognizes that the structuralized document d3 itself, and not fragment f3, has been transmitted. In this case, server 1a parses structuralized document d3 and extracts fragment f3. Accordingly, in terms of the present invention servers 1 coexisting on the network with servers already present is not a problem. Further, name-space prefixes may be added to the elements FJ_LSP_DF or attributes FJ_LSP_CR, and defined as special name-spaces (e.g., fujitsu:, or the like) for elements/attributes.

(3) Processes on Servers

Next, processing in the servers 1 will be explained specifically.

(3-1) Embedding Routine

Figure 10:
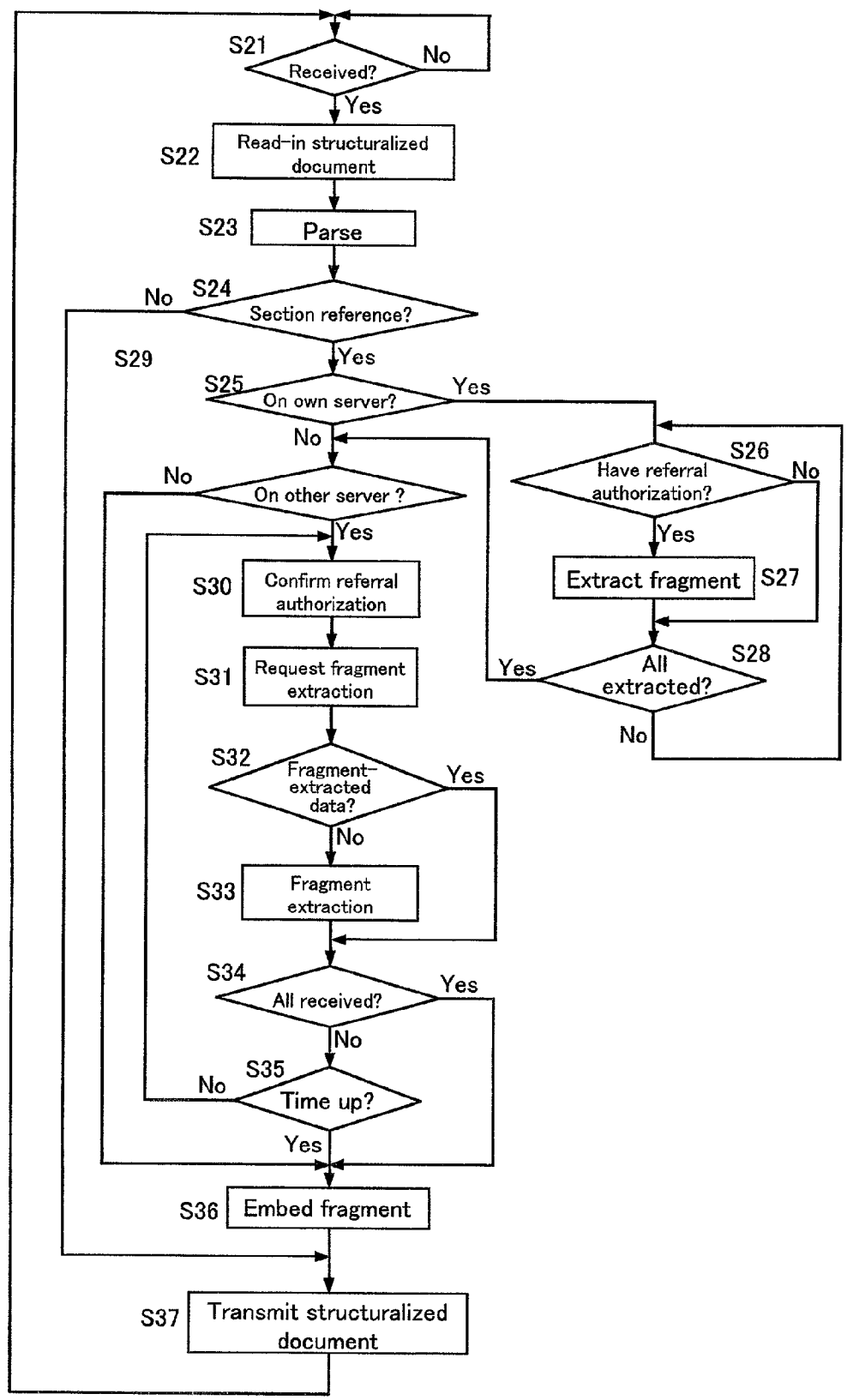
FIG. 10 is a flowchart showing flow in embedding routine.

FIG. 10 is a flowchart showing flow of an embedding routine in server 1a.

Step S21: Communications module 11a stands by for a lookup request from the clients 2 for a structuralized document, and once it has received a lookup request, step S22 ensues. In the present embodied example, communications module 11a receives a lookup request for structuralized document d1 from client 2a, and step S22 ensues. Further, communications module 11a momentarily stores time Tr that it received the lookup request, and time Ts that is a predetermined time period ΔT elapsed since time Tr. Time Ts is set to be the time limit for replying to client 2a.

Step S22: Parsing module 12a reads out the requested structuralized document d1 from text DB 15a.

Step S23: Parsing module 12a parses the read-out structuralized document d1.

Step S24: Parsing module 12a judges whether or not a section reference is contained in structuralized document d1. If it does not contain any section references, later-described step S37 ensues. If it does contain a section reference, step S25 ensues. Because in the present example embodiment section references xl2, xl3 and xl4 are contained in structuralized document d1, step S25 ensues.

Step S25: Parsing module 12a judges whether or not there is a reference to a fragment that is on its server. When the judgment is "Yes," step S26 ensues. When the judgment is "No," step later-described step S29 ensues. Because in the present example embodiment document d1 contains section reference x12 to fragment f2 on its server 1a, step S26 ensues.

Step S26: Parsing module 12a confirms whether or not client 2a has authority to refer to fragment f2. If it has authority to refer, step S27 ensues. If it does not have authority to refer, later-described step S28 ensues, without extraction of the relevant fragment. Section reference x12 in the present embodiment example does not contain a disclosure level, and neither is a disclosure level set for fragment f2. This accordingly means that client 2a has authority to refer to fragment f2.

Step S27: Parsing module 12a reads out and parses structuralized document d2 from text DB 15a, and extracts fragment f2.

Step S28: Parsing module 12a judges whether or not all the referees on server 1a have been extracted. If "Yes" is judged, step S29 ensues. If there are a plurality of referees on server 1a, and all have not yet been extracted, step S26 ensues. In the present example embodiment, if fragment f2 has been extracted, step S29 ensues, and if fragment f2 has not been extracted, the routine returns to step S26, and extraction of unextracted fragments on server 1a is carried out.

Step S29: Parsing module 12a judges whether or not there is a reference to a fragment on a another server apart from its server. If "Yes" is judged, step S30 ensues. If "No" is judged, step S36 ensues. Because section references x13 and x14 in the present embodiment example refer to fragments on other server 1b, step S30 ensues.

Step S30: Parsing module 12a confirms section reference by section reference whether or not client 2a has fragment referral authority. If it does not have referral authority, an extraction request for the relevant fragment is not made. In the present embodiment example, with respect respectively to fragments f3 and f4, whether or not the referral level for client 2a is higher than the disclosure level for section references x13 and x14 is compared. Supposing for example that the referral level for client 2a is "14," the disclosure level for section references x13 and x14 being "3" means that it has referral authority with respect to fragments f3 and f4.

Step S31: Parsing module 12a, with respect to a fragment for which there is judged to be referral authority, transmits an extraction request to server 1b, and receives a reply regarding the request.

Step S32: Fragment-receiving module 13a judges whether or not the data received from server 1b is fragment-extracted data. In a situation where server 1b does not have the present invention's fragment-extraction function, fragment extraction is not attempted; and as was explained with the conventional art, the entire requested structuralized document is sent to server 1a, which is the requester. If the received data is data that has not been fragment-extracted, step S33 ensues. If the received data is a fragment, later-described step S34 ensues.

Step S33: Fragment-receiving module 13a acquires the desired fragment by carrying out a fragment extraction process on the acquired data.

Step S34: Fragment-receiving module 13a judges whether or not all the fragments for which extraction requests were transmitted have been received. When "Yes" is judged, later-described step S36 ensues. When "No" is judged, step S35 ensues.

Step S35: Fragment-receiving module 13a confirms whether or not the time has become the time limit Ts. When "Yes" is judged, step S36 ensues. When "No" is judged, the routine returns to step S30 to receive fragments not yet received.

Step 36: Embedding module 14a embeds the fragment received in step S31 and the fragment extracted in step S27 into structuralized document d1. In the present embodiment example, received fragments f3, f4, and extracted fragment f2 are embedded into structuralized document d1. Here, if in step S35 the time limit has run out, embedding of only the fragments that already have been received or extracted is carried out.

Step S37: Communications module 11a transmits to client 2a structuralized documents not containing references to other resources, or structuralized documents in which referee fragments are embedded. In the present embodiment example structuralized document d1 in which fragments f2, f3 and f4 are embedded is transmitted to client 2a. Client 2a displays the received structuralized document d1. (See later-described FIG. 12.)

Here, if the structuralized document contains references to fragments for which the clients 2 do not have referral authority, the reference description is left as-is and the structuralized document is transmitted to the clients 2.

(3-2) Fragment-Extraction Routine in Server 1b

Figure 11:
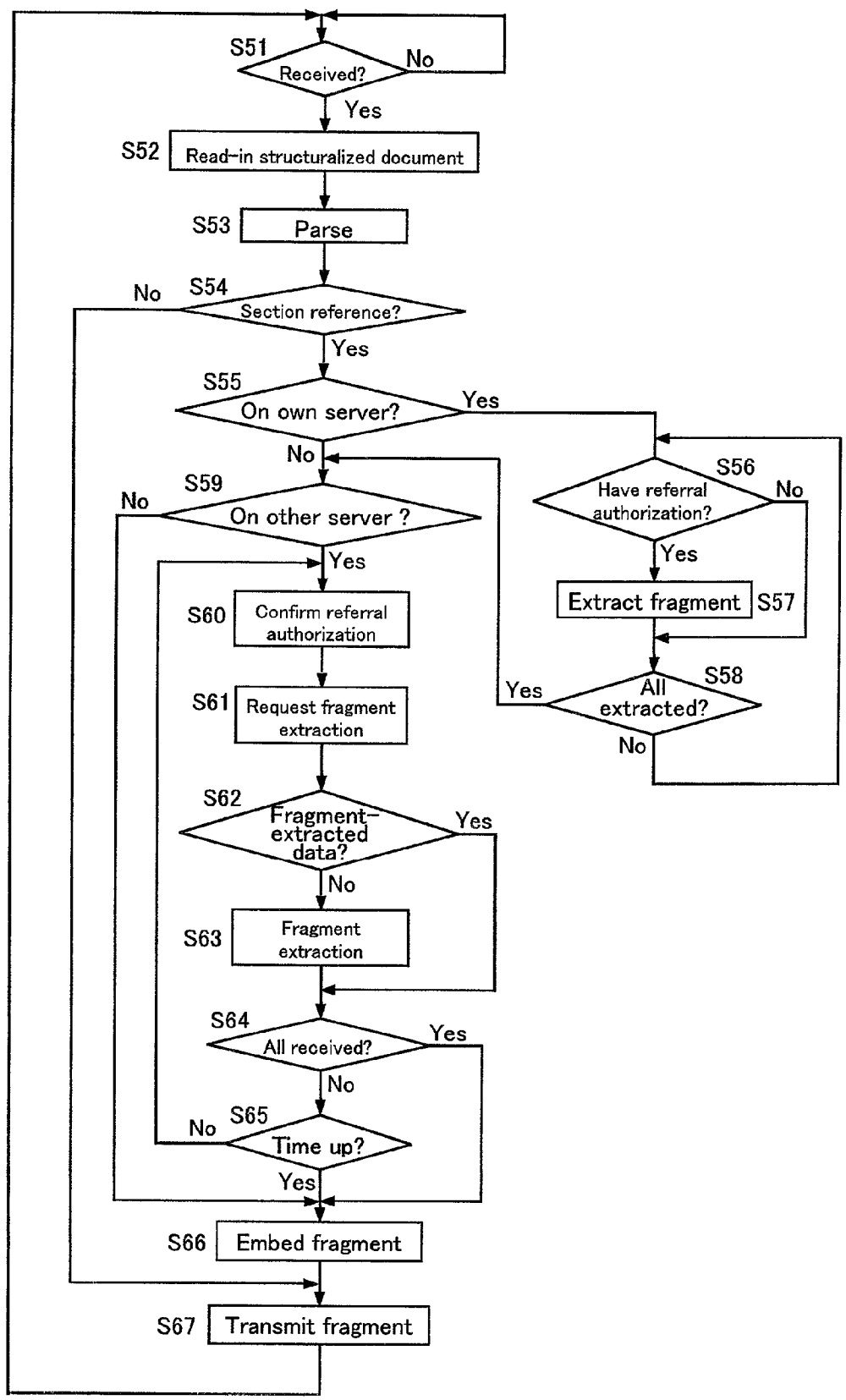
FIG. 11 is a flowchart showing flow in fragment-extraction routine.

FIG. 11 is a flowchart showing flow of an extraction routine for fragments f3 and f4 in server 1b.

Step S51: Communications module 11b stands by for a fragment-extraction request from another server, upon the receipt of which step S52 ensues. In the present example, when communications module 11b receives a request from server 1a to extract fragment f3 or f4, step S52 ensues. Further, communications module 11b stores for the time being the extraction-request receipt time Tr2.

Step S52: Parsing module 12b reads out from text DB 15b the structuralized document d3 or d4 that contains requested fragment f3 or f4.

Step S53: Parsing module 12b parses the read-out structuralized document d3 or d4, and extracts fragment f3 or f4.

Step S54: Parsing module 12b judges whether or not a section reference is contained in extracted fragment f3 or f4. If a section reference is not contained therein, later-described step S67 ensues. If a section reference is therein contained, step S55 ensues. If for example an extraction request for fragment f3 is received, step S67 ensues. Because fragment f4 contains section reference x15, if an extraction request therefor is received, step S55 ensues.

Step S55: The parsing module 12b judges whether or not the section reference is a reference to a fragment that is on its server 1b. When "Yes" is judged, step S56 ensues. When "No" is judged, later-described step S59 ensues. For example, because section reference x15 refers to fragment f5 on server 1c, step S56 ensues.

Steps S56-S58: Extraction of fragments that are on home server 1b is carried out by the same routine as in the foregoing steps S26-28 in FIG. 10. Here, as neither extracted fragment f3 nor f4 in the present example refers to a fragment on its own server, these process steps would not be carried out.

Steps S59-S65: Fragment f5 on other server 1c is acquired by the same routine as in the foregoing steps S29-S35 in FIG. 10. Namely, in step S59, parsing module 12b judges whether or not the section reference is a reference to a fragment that is on another server apart from its server 1b. When "Yes" is judged, step S60 ensues; when "No" is judged, step S66 ensues. Section reference x15 within fragment f4 in the present example refers to fragment f5 that is on server 1c.

Step S60: The parsing module 12b judges section reference by section reference whether or not client 2a has fragment referral authority.

Step S61: The parsing module 12b 1c, with respect to a fragment for which there is judged to be referral authority, transmits an extraction request to server 1c, and receives a reply regarding the request. Further, parsing module 12b establishes a time limit Ts2 for receiving fragment text. In the present example embodiment, the receipt time limit Ts2 is set according to the formula below.

$$Ts2=Ts2*(Tr2Tr)$$

Herein, (Tr2 Tr) is the assumed time required for a communications interchange between server $1a$ and server $1b$.

Step S62: Fragment-receiving module $13b$ judges whether or not data received from server $1b$ is fragment-extracted data. In a situation where server $1c$ does not have the present invention's fragment-extraction function, fragment extraction is not attempted; and as was explained with the conventional art, the entire requested structuralized document is sent to server $1b$, which is the requester. If the received data is data that has been fragment-extracted, later-described step S64 ensues. If the received data is data that has not been fragment-extracted, step S63 ensues.

Step S63: Fragment-receiving module $13b$ acquires the desired fragment by carrying out a fragment extraction process on the acquired data.

Step S64: Fragment-receiving module $13b$ judges whether or not all the fragments for which extraction requests were transmitted have been received, and later-described steps S66 or S65 ensue. If for example fragment f5 has been received, step S66 ensues; if fragment f5 has not yet been received, step S65 ensues.

Step S65: Fragment-receiving module $13b$ judges whether or not the time has become the time limit Ts2, and either step S66 or step S60 ensues.

Step S66: Embedding module $14b$ embeds an acquired fragment into a referee fragment. For example, fragment f5 is embedded into fragment f4.

Step S67: Communications module $11b$ transmits to server $1a$ a fragment without a section reference, or a fragment in which is embedded an acquired fragment. For example, for a fragment f3 extraction request, fragment f3 is transmitted as is. For a fragment f4 extraction request, fragment 4 in which fragment f5 is embedded is transmitted to server $1a$.

(3-3) Routines in Servers $1a$-$1c$

Here, a fragment f5 extraction routine in server $1c$ is carried out according to the same flow as the above-noted fragment-extraction process in server $1b$.

Further, as mentioned earlier, the foregoing embedding routine and fragment-extraction routine preferably can be carried out independently in any of the servers $1a$-$1c$.

(3-4) Example of Embedding-Processed Text Display

FIG. 12 is an example of display on client $2a$ of an embedding-processed structuralized document d1. In place of section-reference description, the content of referee fragments f2-f5 is displayed in a predetermined format. Copyright information is displayed together with the fragments f3 and f4.

In the manner above, network burden is relieved by transmitting/receiving the structuralized document fragments only. Nevertheless, compatibility with conventional technology is kept, and a situation in which only a portion of servers on a network is replaced with servers in terms of the present invention would be workable. In addition, having structuralized documents used in accordance with the intentions of the structuralized document providers is made possible.

Other Embodiments (A) A First Among Other Methods of Restricting Fragment Referral Section references may be described in a file ("link base" hereinafter) separate from structuralized document d1, such that an embedding routine based on link bases that differ client to client may be carried out. Section reference descriptions and referral restrictions can be segregated from structuralized document d1.

Figure 13:
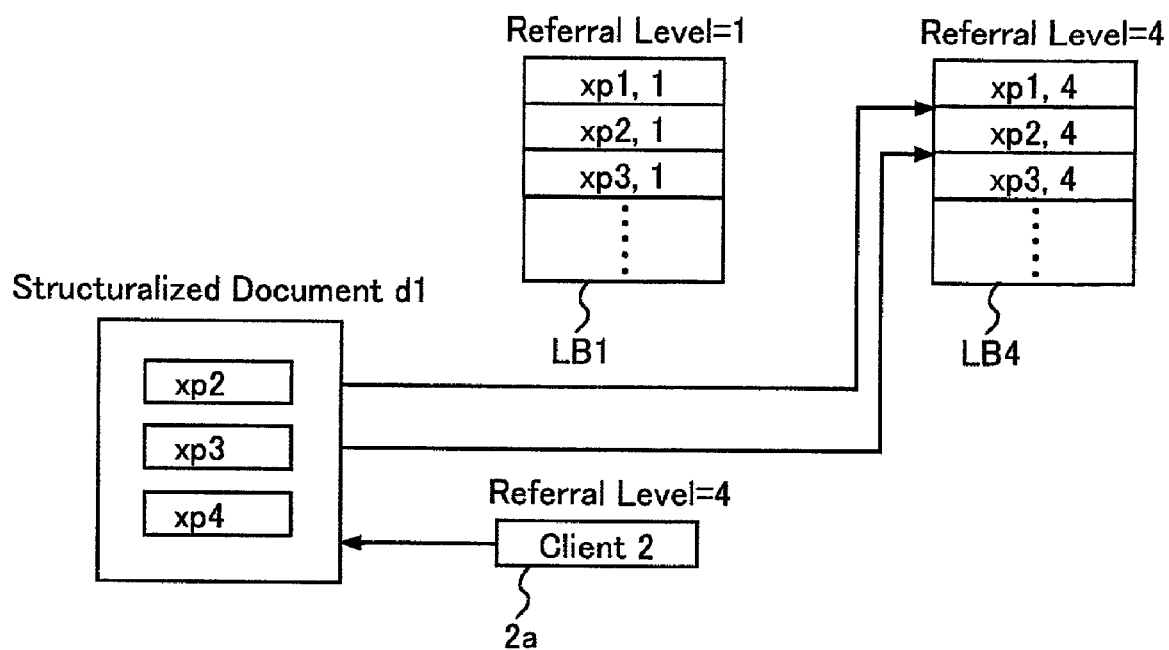
FIG. 13 is an explanatory diagram illustrating another scheme for structuralized-document referral restriction.
Figure 14:
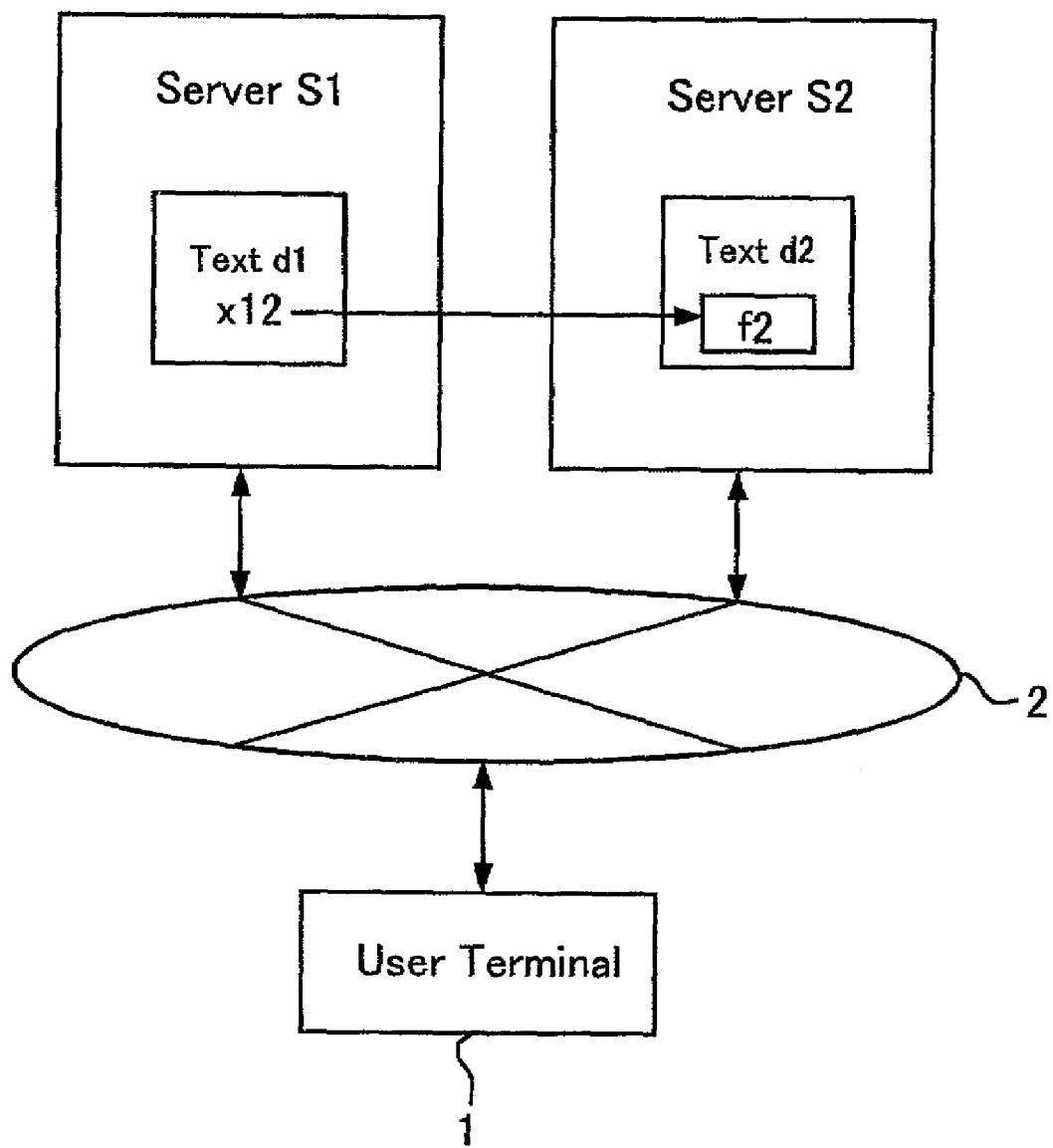
FIG. 14 is an explanatory diagram of conventional art.

FIG. 13 is an explanatory diagram illustrating a referral-restriction schema having to do with a second embodiment of the present invention. Server $1a$ is further provided with link bases LB 1-4. The link bases AB 1-4 are provided in a plurality corresponding to the client referral level. Section-reference descriptions associated with the referral levels are stored in each of the link bases LB 1-4. Instead of section references xl2-xl4, pointers xp2-xpr for each link base LB 1-4 are described in structuralized document d1.

When server $1a$ receives a request for structuralized document d1 from section-reference level "4" client $2a$, it parses structuralized document d1 and extracts pointers xp2-xp4. Server $1a$ accesses link base LB4 corresponding to referral level 4, and reads out the description for the section reference indicated by pointers xp2-xp4. Thereafter it carries out the embedding routine likewise as noted earlier.

(B) A Second Among Other Methods of Restricting Fragment Referral

In the foregoing example embodiment, referral restriction is performed according to referrer structuralized document d1, but referral restriction may be made according to referee resources. For example, disclosure level fjreflevel="3" is described in tag <head> of structuralized document d3. In this case, the referral restriction routine is carried out as in the following. Server $1a$ describes the disclosure level for client $2a$ in the fragment f3 extraction request. Referee server $1b$ compares the fragment f3 disclosure level written in the tag <head> with the client $2a$ referral level, and determines whether or not to send back the fragment.

(C) Other Method for Restricting Time Period for Replying to Clients

Instead of setting time limits for replying to clients, restrictions on counts tracking referees may be provided. In addition, server levels in a tree structure with server $1a$ as the root may be established and restrictions on server levels provided.

(D) Explanation in Setting Forth the Foregoing First Embodiment was Made Taking a Situation in Which the Resources are Structuralized Documents as an Example, but the Resources do not Have to be Structuralized Documents. For Example, the Referee for Structuralized Document d1 may be an Image File or an Audio File.

(E) Fragment Referral Log Creation

In the foregoing first embodied example, creating a log of fragment referrals is possible. Client identifying information is acquired together with a request for structuralized document d1 from client $2a$. Server $1a$ stores correlations of client $2a$ with resources, which are structuralized document d1 and its referees, that server $1a$ holds. Specifically, structuralized document d1 and fragment f2 are respectively assigned correspondences to client $2a$ that are stored.

Further, when server $1a$ or server $1b$ extracts a fragment for other servers, it combines the fragment with client $2a$ identifying information and transmits the combination. Servers $1b$ and $1c$ store correlations of client $2a$ with resources, which are structuralized document d1 referees, that each server itself respectively holds. Specifically, server $1b$ assigns fragments f3 and f4 correspondences to client $2a$ that are stored. In addition, server $1c$ correlatively stores fragment f5 and client $2a$.

In this way, storing resource referents that each server itself holds facilitates resource administration of who has referred to what resource how many times. In addition to resources and referents, suitably storing information on referral date and time is also conceivable.

(F) Programs for Executing the Foregoing Method, as Well as Computer-Readable Media on Which the Programs are Recorded are Included by the Present Invention. Computer- Readable Floppy Disks, Hard Disks, Semiconductor Memory, CD-ROMs, DVDs, magneto-Optical Disks (MOs) and the Like may be Given as Examples of Recording Media Herein.

Exploiting the present invention prevents wasted transmission and reception of resources on a network, makes effective use of network resources, and relieves processing burden on clients.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An information provision method utilized by a first information-provision device being included among information-provision devices which are connected to an information display device via a network, the information-provision devices having a function for providing a structuralized document requested from the information display device, wherein the structuralized document has a description referring to other resources, the information provision method including:
    accepting a request for providing a structuralized document containing a description of a reference to a resource on the network from the information display device or any other information-provision device;
    reading out the structuralized document, and extracting from the structuralized document the description of the reference to the resource, wherein the description of the reference is contained in the structuralized document and written in a predetermined description format;
    judging, if the resource is held in the first information-provision device, or is held in a second information-provision device included among the information-provision devices, based on the description of the reference to the resource;
    reading out the resource if the resource is held in the first information-provision device;
    requesting and acquiring the resource from the second information-provision device holding the resource, if the resource is not held in the first information-provision device;
    embedding a referred part of the resource into the structuralized document based on the description of the reference to the resource written in the predetermined description format;
    transmitting the structuralized document, into which the referred part of the resource is embedded, to the information display device or the information-provision device which sent the request for providing the structuralized document via the network;
    retrieving a description of a reference to a supplemental resource on the network from within the resource; and
    carrying out said judging, said reading out, said requesting and acquiring, and said embedding relative to the supplemental resource, if the resource includes the description of the reference to the supplemental resource.

2. The information provision method set forth in claim 1, wherein said requesting and acquiring of the resource includes:
    transmitting a request identifier specifying the request, in addition to the request for the resource; and
    acquiring the request identifier, in addition to the resource.

3. The information provision method set forth in claim 1, wherein said requesting and acquiring of the resource includes transmitting a suspend condition for suspending acquisition of the resource, in addition to the request for the resource.

4. The information provision method set forth in claim 1, wherein said accepting includes accepting a referral level for the information display device, in addition to the request for providing the structuralized document from the information display device and the information provision method further includes:
    comparing a disclosure level contained in a referee or referrer resource, with the referral level; and
    restricting embedding of the referee resource into the referrer resource based on the comparison results.

5. The information provision method set forth in claim 1, wherein said requesting and acquiring of the resource includes sending a requester identifier identifying a resource-acquisition requester, in addition to the request to the second information-provision device.

6. An information provision method utilized by a second information-provision device, connected via a network to a first information-provision device which holds resources that include a structuralized document, wherein the second information-provision device holds a resource to which the structuralized document refers, the information provision method including:
    accepting a request for acquisition of the resource to which the structuralized document refers from the first information-provision device;
    extracting the resource;
    transmitting the resource to the first information-provision device via the network
    reading out the resource and retrieving a description of a reference to a supplemental resource on the network;
    judging whether or not the supplemental resource is held in the second information-provision device based on the description of the reference to the supplemental resource;
    reading out the supplemental resource, if the supplemental resource is held in the second information-provision device;
    embedding the supplemental resource into the resource;
    requesting the supplemental resource from a network-connected third information-provision device holding the supplemental resource, if the supplemental resource is not held in the second information-provision device; and
    acquiring the supplemental resource from the third information-provision device.

7. The information provision method set forth in claim 6, wherein:
    said accepting of the request includes transmitting a request identifier specifying the request, in addition to the request for the resource;
    said requesting includes transmitting the request identifier, in addition to the request for the supplemental resource; and
    said acquiring of the supplemental resource includes acquiring the request identifier, in addition to the supplemental resource.

8. The information provision method set forth in claim 6, wherein said accepting of the request includes accepting a suspend condition for suspending acquisition of the supplemental resource, in addition to the request for the resource, and the information provision method further includes:
    suspending acquisition of the supplemental resource based on the suspend condition.

9. The information provision method set forth in claim 6, wherein said accepting of the request includes accepting a referral level for the information display device having requested the structuralized document to the first information-provision device, in addition to the acquisition request for the resource; and said requesting of the supplemental request includes transmitting the referral level for the information display device having requested the structuralized document, in addition to the request for the supplemental resource.

10. The information provision method set forth in claim 6, wherein said accepting of the request includes transmitting a request identifier specifying the request for acquisition of the resource, in addition to the request for acquisition of the resource; and said transmitting of the resource includes transmitting the request identifier, in addition to the resource.

11. The information provision method set forth in claim 6, wherein said accepting of the request includes accepting a referral level for the information display device having requested the structuralized document to the first information-provision device, in addition to the request for acquisition of the resource and the information provision method further includes:

comparing a disclosure level contained in a referee or referrer resource, with the referral level; and restricting an embedding of the referee resource into the referrer resource based on the comparison results.

12. The information provision method set forth in claim 6, wherein said accepting of the request includes accepting a requester identifier identifying a requester having requested the resource, in addition to the request for acquisition of the request from the first information-provision device, and the information provision method further includes:

assigning and storing correspondences between the resource and the requester identifier, as well as another resource stored in the second information-provision device which refers to the resource, and the requester identifier.

13. The information provision method set forth in claim 6, wherein the resource is a portion of a second structuralized document, and the information provision method further includes extracting the resource from the second structuralized document, by parsing the structuralized document.

14. A first information-provision device, included among information-provision devices connected to an information display device via a network, the first information-provision device comprising:

an acceptance unit for accepting from the information display device or any other information-provision device a request for providing structuralized document containing a description of a reference to a resource on the network;

a reference extraction unit for reading out the structuralized document, and extracting the description of the reference to the resource from the structuralized document, wherein the description of the reference is contained in the structuralized document and written in a predetermined description format;

an address-judging unit for judging if the resource is held in the first information-provision device, or is held in a second information-provision device included among the information-provision devices, based on the description of the reference to the resource;

a resource read-out unit for reading out the resource, if the resource is held in the first information-provision device;

a resource acquisition unit for requesting and acquiring the resource from the second information-provision device holding the resource, if the resource is held in the first information-provision device;

an embedding unit for embedding a referred part of the resource into the structuralized document based on the description of the reference to the resource written in the predetermined description format; and a transmitting unit for transmitting the structuralized document, into which the referred part of the resource is embedded, to the information display device or any other information-provision device via the network, wherein if said reference extraction unit further retrieves a description of a reference to a supplemental resource on the network from within the resource, said address-judging unit carries out said judging, said resource read-out unit performs said reading out, said resource acquisition unit performs said requesting and acquiring, and said embedding unit performs embedding relative to the supplemental resource.

15. A computer-readable storage medium on which is recorded an information provision program utilized by a first information-provision device included among information-provision devices connected to an information display device via a network, the computer-readable storage medium on which is recorded an information provision program for executing:

accepting from the information display device or any other information-provision device a request for providing a structuralized document containing a description of a reference to a resource on the network;

reading out the structuralized document, and extracting the description of the reference to the resource from the structuralized document, wherein the description of the reference is contained in the structuralized document and written in a predetermined description format;

judging if the resource is held in the first information-provision device, or it is held in a second information-provision device included among the information-provision devices based on the description of the reference to the resource;

reading out the resource, if the resource is held in the first information-provision device;

requesting and acquiring the resource from the second information-provision device holding the resource, if the resource is held in the first information-provision device;

embedding a referred part of the resource into the structuralized document based on the description of the reference to the resource written in the predetermined description format; and transmitting the structuralized document, into which the referred part of the resource is embedded, to the information display device or any other information-provision device via the network, wherein if a description of a reference to a supplemental resource on the network is retrieved from within the resource, said judging, said reading out, said requesting and acquiring, and said embedding are performed relative to the supplemental resource.

* * * * *